United States Patent
Marmaropoulos et al.

(10) Patent No.: US 7,378,608 B2
(45) Date of Patent: May 27, 2008

(54) STRETCHABLE FABRIC SWITCH

(75) Inventors: George Marmaropoulos, Yorktown Heights, NY (US); Giang Truong Vu, Ossining, NY (US); Katherine Pulford, Hackney (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 221 days.

(21) Appl. No.: 10/558,732

(22) PCT Filed: Jun. 2, 2004

(86) PCT No.: PCT/IB2004/050828

§ 371 (c)(1),
(2), (4) Date: Nov. 29, 2005

(87) PCT Pub. No.: WO2004/109730

PCT Pub. Date: Dec. 16, 2004

(65) Prior Publication Data

US 2006/0251854 A1    Nov. 9, 2006

Related U.S. Application Data

(60) Provisional application No. 60/476,477, filed on Jun. 6, 2003.

(51) Int. Cl.
*H01B 7/08* (2006.01)
*H01C 10/10* (2006.01)

(52) U.S. Cl. .................... 200/511; 174/117 M; 338/47; 338/101

(58) Field of Classification Search ........... 200/52 R, 200/511, 512; 338/99, 114, 47, 101; 174/128.1, 174/126.2, 257, 117 M; 139/1 R, 421, 420 C, 139/425 R; 428/100–102, 208–210, 244, 428/281; 361/212, 220; 73/862.68, 775; 219/545; 114/99, 210
See application file for complete search history.

(56) References Cited

U.S. PATENT DOCUMENTS

| | | | |
|---|---|---|---|
| 4,429,580 A * | 2/1984 | Testa et al. .................... 73/768 |
| 4,659,873 A * | 4/1987 | Gibson et al. ............ 178/18.05 |
| 4,700,054 A * | 10/1987 | Triplett et al. .............. 219/545 |
| 4,715,235 A | 12/1987 | Fukui et al. |
| 4,813,459 A * | 3/1989 | Breidegam ................. 139/421 |
| 5,079,535 A * | 1/1992 | Neuman et al. ............... 338/2 |
| 5,371,326 A | 12/1994 | Clearwaters-Dreager et al. |
| 5,906,004 A * | 5/1999 | Lebby et al. ...................... 2/1 |
| 6,210,771 B1 | 4/2001 | Post et al. |
| 6,642,467 B2 * | 11/2003 | Farringdon ................. 200/511 |
| 6,714,117 B2 * | 3/2004 | Sandbach .................... 338/101 |
| 7,145,432 B2 * | 12/2006 | Lussey et al. ................ 338/47 |
| 7,161,084 B2 * | 1/2007 | Sandbach ............. 174/117 M |
| 2002/0180578 A1 | 12/2002 | Sandbach |

* cited by examiner

*Primary Examiner*—Michael A Friedhofer

(57) ABSTRACT

The present invention provides a stretchable fabric that may serve as a switch device or coupling to an electronic device and a power source by merely stretching or pusing the fabric. The stretchable fabrics may be usable in a wearable garment, furniture, or other suitable locations where it can be incorporated to close a circuit. Through a releasable stretching or pushing action by the user, electrically conductive strips integrated in the fabrics come in contact to activate related ancillary equipment such as power supplies or electronic devices.

20 Claims, 5 Drawing Sheets

STRETCHABLE FABRIC SWITCH

CROSS REFERENCE TO RELATED APPLICATION

This application claims the benefit of U.S. provisional application Ser. No. 60/476,477 filed Jun. 6, 2003, which is incorporated herein by reference.

The present invention relates to a fabric switch system intended to permit the connection of an electronic device or power source. More specifically, the present invention relates to a stretchable fabric switch system that may be implemented in an article of clothing, furniture, or in other location to serve as a coupling of electrical signals or power.

Intuitive switches that utilize soft fabric materials are conductive fibers and are highly desirable in wearable or other electronics applications. Techniques known for providing an electrical switch system in clothing fabric typically include adding electric wires and control devices to the fabric, by incorporating the wires directly into the fabric or by attaching the wires to the fabric, e.g., by sewing.

The present invention discloses stretchable electro-conductive fabrics, which include a first fabric layer that is shaped in a periodic wave-like form and having a plurality of first conductive strips therein, and a second fabric layer having a plurality of second conductive strips therein and fixably mounted on the first fabric layer. In operation, a user stretches the fabrics such that at least one of the first conductive strips comes in contact electrically with at least one of the second conductive strips. Alternatively, the first layer is deformable by a push action of the user to allow at least one of the first conductive strips to contact at least one of the second conductive strips electrically. In either case, the first and second fabric layers are deformable and have different conductive levels that vary with the degree of deformation. Further, the first and second conductive strips may be coupled to a fabric circuit integrated in a garment or furniture, or can serve as a coupling to an electronic device or a power source.

According to one aspect of the invention, a garment or furniture of desired form and function can be constructed in a conventional manner using readily available fabrics and materials, and the stretchable electro-conductive fabrics serving as a switch system can be positioned advantageously within a wearable garment or furniture that permits easy manual activation by a person.

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
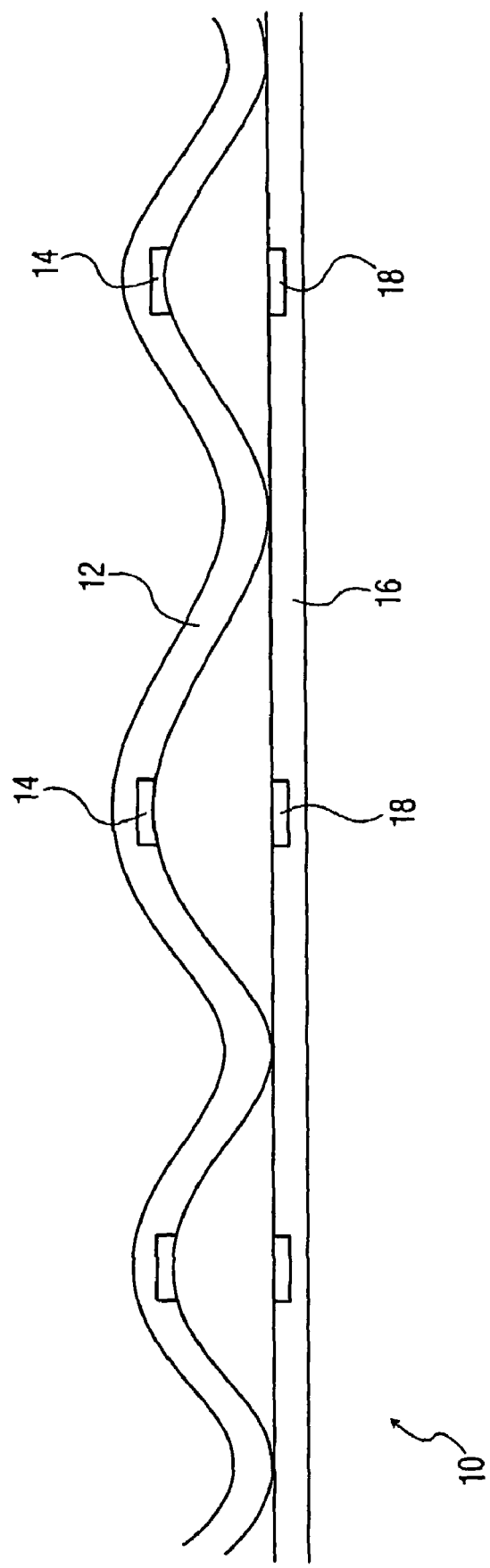
FIG. 1 illustrates an embodiment of a stretchable fabric switch system in accordance with this invention.

Referring now to FIG. 1 of the drawings, a stretchable fabric switch system 10 or a series of switches in accordance with this invention includes a first layer 12 having a plurality of first conductive fiber strips 14 shaped in a wave-like form and a second layer 16 having a plurality of second conductive fiber strips 18.

The material of the first and second layers 12 and 16 may be either natural or synthetic, and the fabric created from such materials can be either woven or sheet-formed in any well-known manner. Alternatively, the layers 12 and 16 may be constructed from non-woven (felted) or knitted fabrics or a composite structure. However, in each alternative case, electrically conductive fiber strips 14 and 18 are included in the production of the fabric, thus providing electrically conductive layers.

In the embodiment illustrated in FIG. 1, the two layers 12 and 16 may be incorporated in the form of a conventional sleeveless top shirt or a short or long-sleeved vest or jacket, for example. In an alternate embodiment, the two layers 12 and 16 may be implemented in furniture or in other locations where the layers of electrically conductive fiber strips 12 and 16 may be used as a coupling of electrical signals, power, or other external electronic device.

Figure 2:
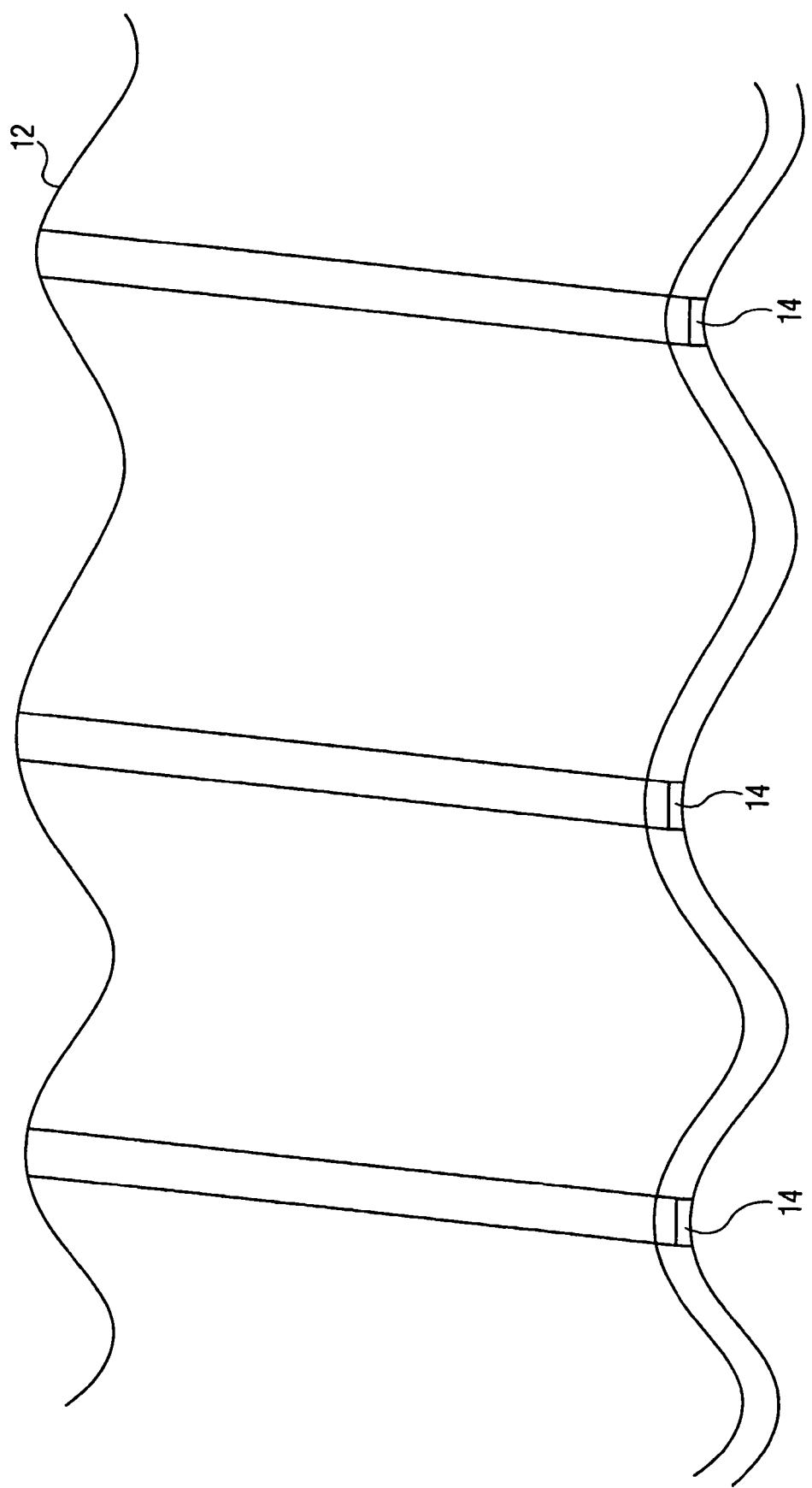
FIG. 2 illustrates one fabric layer of the switch system of FIG. 1 in accordance with a first embodiment of this invention.
Figure 3:
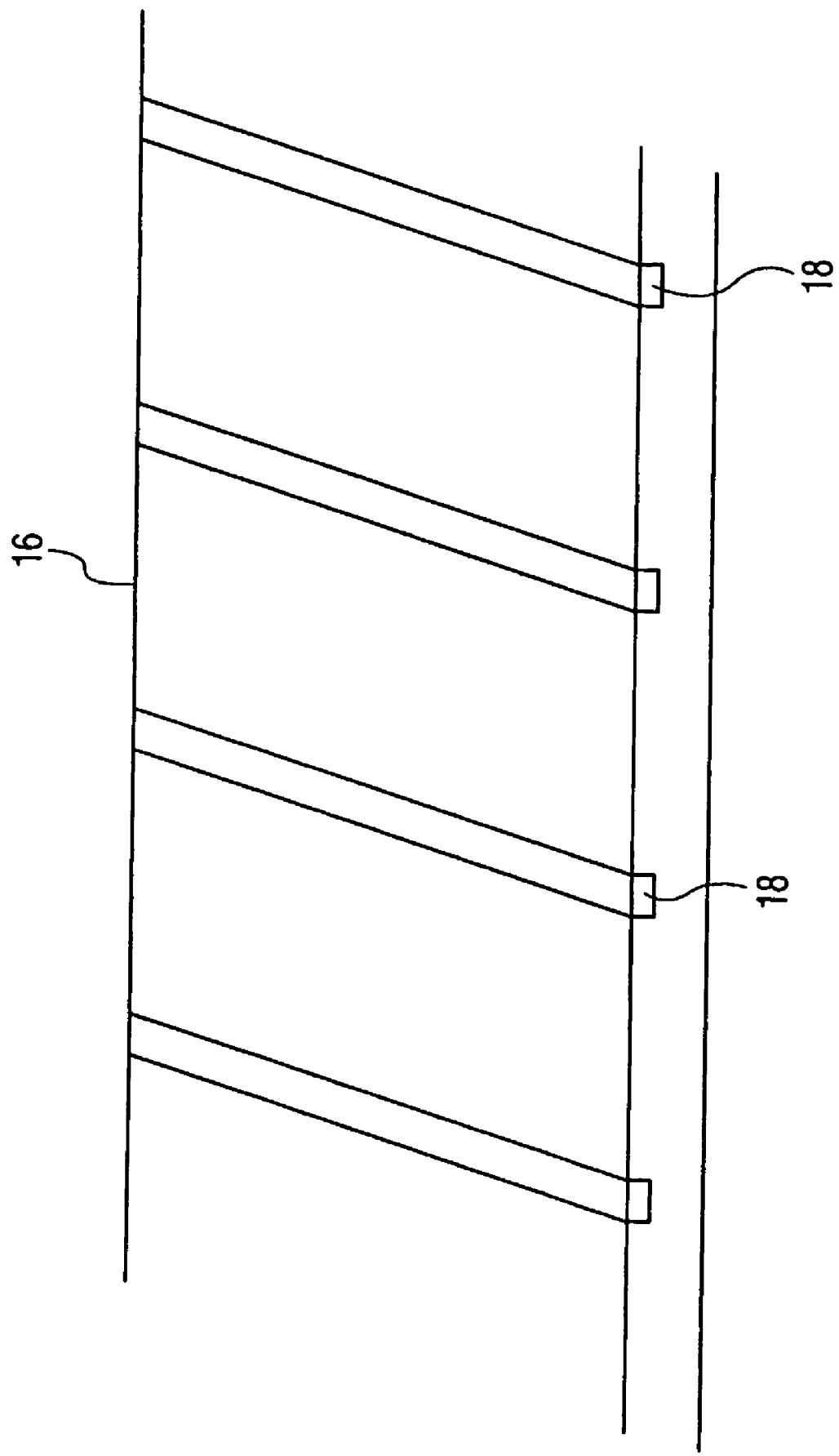
FIG. 3 illustrates another fabric layer of the switch system of FIG. 1 in accordance with a first embodiment of this invention.

Referring to FIGS. 2 and 3, the first conductive fiber strips 14 are located on a curvature of the first layer 124 from one edge of the layer to another. The second conductive fiber strips 18 are positioned in parallel with the first conductive fiber strips 14 along the second layer 16 and spaced apart by a predetermined distance. As shown, the conductive strips 14 and 18 are kept apart due to arcs supported by lycra weft picks. As can be seen in FIGS. 2 and 3, the fiber strip 14 is positioned along the apex of the arcs or waves of first layer 12. Second layer 16 is a flat or planar section so that each of the waves or arcs of the first layer 12 defines a space therebetween which separates the first and second conductive strips 14 and 18 in the absence of a bias, such as stretching or pressing.

The conductive fiber strips 14 and 18 may be produced by printing them onto the fabric layers 12 and 16 or may be mounted as adhesive tape. Alternatively, the conductive fiber strips 14 and 18 may be produced by printing a material containing conductive particles onto the fabric layers 12 and 16. All of the alternative described methods provide a suitable bond, forming a reliable electrical connection.

Furthermore, the conductive strips 14 and 18 may be coupled to a power source, an output device, a cable for connection to another electronic device, fabric-mounted circuit, etc., in the form of loops to receive or otherwise engage equipment considered ancillary to the fabric switch 10, such as an external heart-monitoring device, external defibrillator, cell phone, radio, pager, GPS device, personal communication assistant, or other signal transmitter or duplex interactive system. Alternatively, such ancillary equipment or other electronic devices may be integrated in the garment or furniture and used in conjunction with the fabric switch system 10 for transmitting the desired signals or power in any well-known manner.

Figure 4:
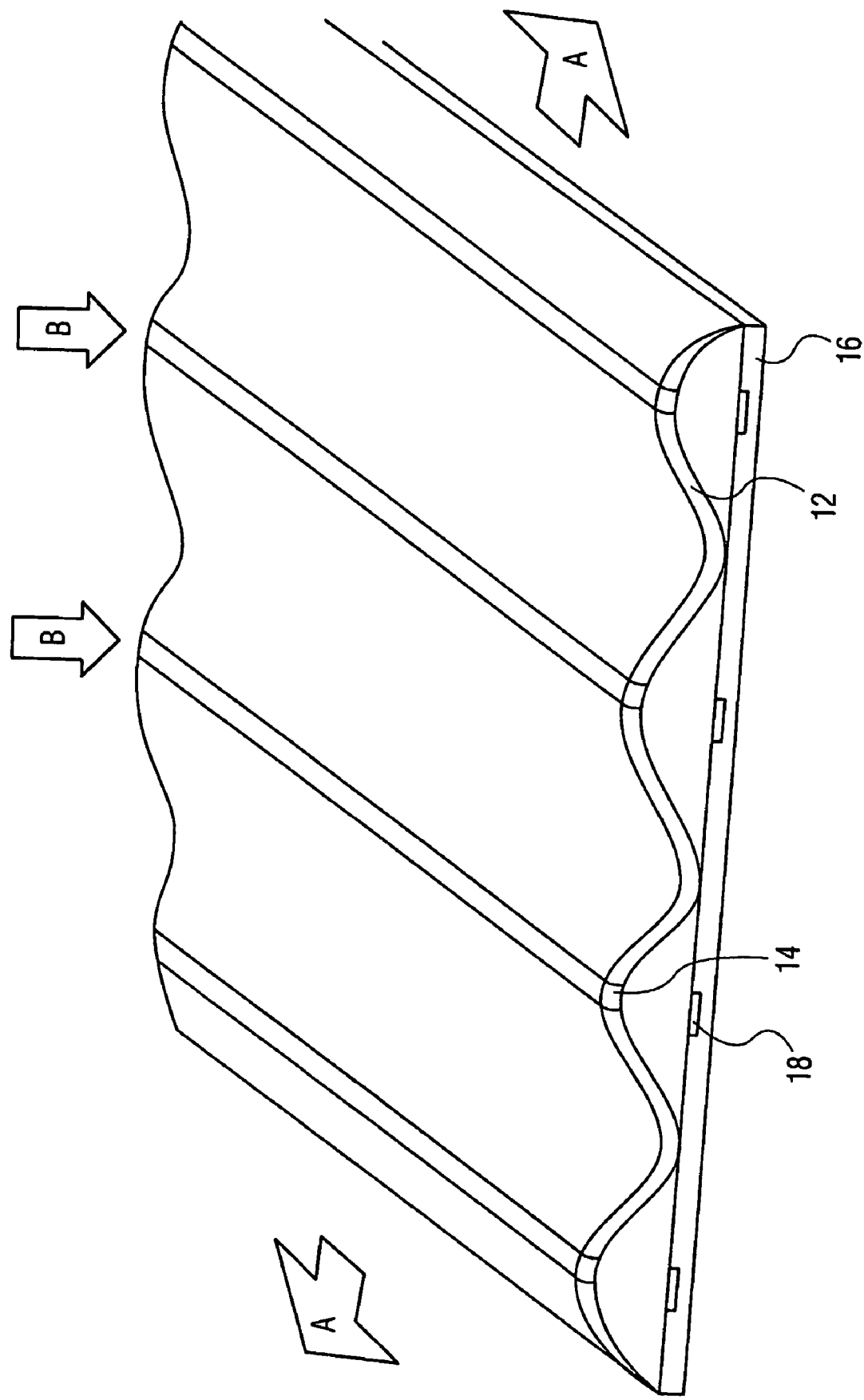
FIG. 4 is a perspective view of the switch system of FIG. 1 in accordance with this invention.
Figure 5:
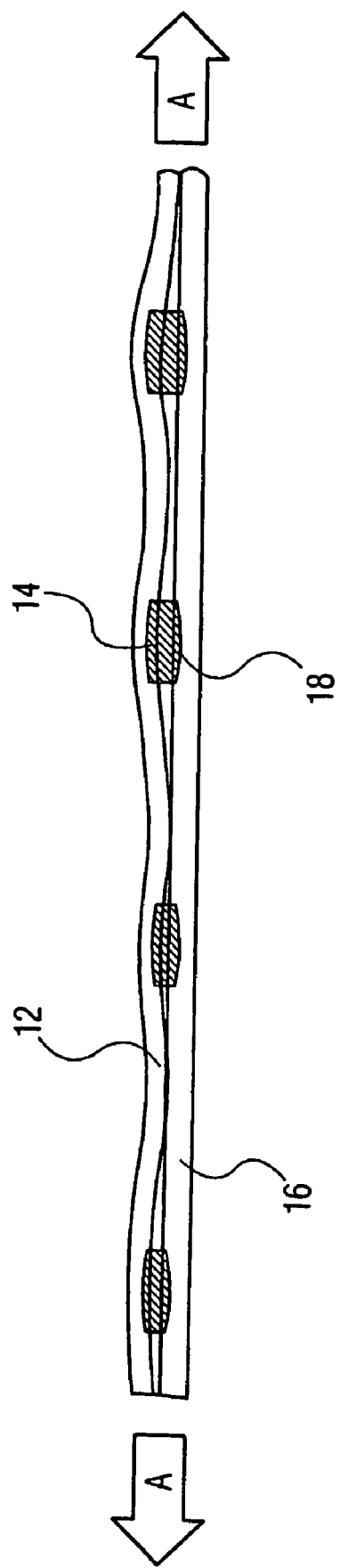
FIG. 5 is a perspective view of the switch system of FIG. 4 in accordance with this invention.

Referring to FIG. 4, in operation, a force indicated by arrows is stretched (A) or pressed (B) by the user so that the respective conductive fiber strips come in contact physically and electrically. As shown in FIG. 5, the first layer 12 is deformable so that the respective conductive fiber strips 14 and 18 come into contact with each other physically and electrically. Accordingly, a user can readily engage the closing of a circuit defined by the two layers 12 and 14 of fabric or an ancillary device by merely stretching or pushing the fabric layers as shown in arrow directions. Note that when the two layers are stretched, there could be different levels of arc resistance built into the fabric of the first layer so that different values or number of switches may be closed with increase in the stretch force, thus providing different levels of switching mechanism.

While the preferred embodiments of the present invention have been illustrated and described, it will be understood by those skilled in the art that various changes and modifications can be made, and equivalents may be substituted for elements thereof without departing from the true scope of the present invention. Thus, the shape of an interconnect system in the drawings should not impose limitations on the scope of the invention. Therefore, it is intended that the present invention not be limited to the particular embodiment disclosed as the best mode contemplated for carrying out the present invention, but that the present invention include all embodiments falling within the scope of the appended claims.

What is claimed is:

1. A stretchable electro-conductive fabric comprising: a first fabric layer having at least one first conductive strip therein and a shape which is substantially arc-like; and a second fabric layer having at least one second conductive strip therein and fixably attached to said first fabric layer, wherein at least one of said first and second fabrics are deformable to provide contact between said first and second conductive strips electrically, and wherein the first and second conductive strips are parallel to each other.

2. The stretchable switch of claim 1, wherein said first conductive strip is positioned along an apex of an arc formed by the first layer.

3. The stretchable switch of claim 2, wherein the arc is a portion of a periodic wave shape of the first layer, wherein said second layer is planar, and wherein the periodic wave shape defines a series of spaces between the first and second layers.

4. The stretchable switch of claim 1, wherein both of the first and second layers are deformable, and wherein said first and second conductive strips are coupled to a fabric circuit integrated in a garment or furniture.

5. The stretchable switch of claim 1, wherein said first and second conductive strips serve as a coupling to at least one of an electronic device and a power source.

6. The stretchable switch of claim 1, wherein at least one of said first and second conductive strips have variable conductivity based upon an amount of deformation.

7. The stretchable switch of claim 1, wherein at least one of said first and second conductive strips connected to the first or second layers by adhesive tape.

8. A stretchable switch comprising: a first fabric layer, shaped in a periodic wave-like form, having a plurality of first conductive strips therein; and a second fabric layer having a plurality of second conductive strips therein and fixably mounted on said first fabric layer, wherein at least one of said first and second fabric layers are deformable to allow the plurality of said first conductive strips to contact the plurality of said second conductive strips electrically, and wherein the first and second layers define a plurality of spaces therebetween.

9. The stretchable switch of claim 8, wherein both of said first and second layers are deformable, and wherein the plurality of first and second conductive strips are parallel to each other.

10. The stretchable switch of claim 8, wherein the plurality of said first and second conductive strips (14, 18) are coupled to a fabric circuit integrated in a garment or furniture.

11. The stretchable switch of claim 8, wherein the plurality of said first and second conductive strips (14, 18) serves as a coupling to at least one of an electronic device and a power source.

12. The stretchable switch of claim 8, wherein each of the plurality of said first conductive strips is positioned along an apex of the periodic wave-like form.

13. The stretchable switch of claim 8, wherein at least one of the plurality of said first and second conductive strips have variable conductivity based upon an amount of deformation.

14. The stretchable switch of claim 8, wherein at least one of the plurality of said first and second conductive strips are connected to the first or second layers by adhesive tape.

15. The stretchable switch of claim 8, wherein the second layer has a flat shape.

16. A method for permitting a person to activate an electronic device, said method comprising the steps of:
providing a first fabric layer, shaped in a periodic wave-like form, having a plurality of first conductive strips and a second fabric layer having a plurality of second conductive strips therein, each of the first conductive strips being positioned along an apex of the periodic wave-like form;
dressing said person in a wearable garment provided with said first and second fabric layers;
coupling said first and second conductive strips to an electronic device or a power source; and
deforming at least one of said first and second fabric layers so that at least one pair of the plurality of said first and second conductive strips comes in contact electrically.

17. The method of claim 16, wherein said periodic wave-like form defines a series of spaces between the first and second fabric layers.

18. The method of claim 16, further comprising the steps of deforming both of the first and second fabric layers; and varying the conductivity of at least one of the first and second conductive strips based upon an amount of deformation.

19. A method for permitting a person to activate an electronic device, said method comprising the steps of:
providing a first fabric layer, shaped in a periodic wave-like form, having a plurality of first conductive strips and a second fabric layer having a planar shape and a plurality of second conductive strips therein;
providing furniture having fabrics equipped with said first and second fabric layers;
coupling at least one of an electronic device and a power source to the first and second conductive strips; and
deforming at least one of said first and second fabric layers so that the plurality of said first and second conductive strips come in contact electrically.

20. The method of claim 19, further comprising the steps of deforming both of the first and second fabric layers; and varying the conductivity of at least one of the first and second conductive strips based upon an amount of deformation.

* * * * *